United States Patent [19]
Yoneda et al.

[11] Patent Number: 6,159,581
[45] Date of Patent: Dec. 12, 2000

[54] LEATHER-LIKE SHEET

[75] Inventors: Hisao Yoneda, Okayama-ken; Teruo Kitamura, Hyogo-ken; Takeshi Kasutani, Wakayama-ken, all of Japan

[73] Assignees: Kuraray Co., Ltd., Kurashiki; Sanplus Co., Ltd., Gose, both of Japan

[21] Appl. No.: 09/144,033

[22] Filed: Aug. 31, 1998

[30] Foreign Application Priority Data

Sep. 24, 1997 [JP] Japan .................................. 9-276490

[51] Int. Cl.⁷ .............................. B32B 27/14; B41J 2/01
[52] U.S. Cl. ......................... 428/195; 428/199; 428/203; 347/105
[58] Field of Search ............................ 347/105; 428/195, 428/199, 203

[56] References Cited

U.S. PATENT DOCUMENTS 3,939,021   2/1976   Nishibayashi et al. .
5,515,093   5/1996   Haruta et al. ............................ 347/101

FOREIGN PATENT DOCUMENTS 0 690 084   1/1996   European Pat. Off. .

OTHER PUBLICATIONS

Patent Abstracts of Japan, vol. 097, No. 007, Jul. 31, 1997, JP 09 059700, Mar. 4, 1997.

*Primary Examiner*—William Krynski
*Assistant Examiner*—J. M. Gray
*Attorney, Agent, or Firm*—Oblon, Spivak, McClelland, Maier & Neustadt, P.C.

[57] ABSTRACT

Disclosed herein are a leather-like sheet which comprises a fibrous base material (A), a concealing layer (B), an easily dyeable layer (C) each on the fibrous base material (A) in this order, an image (D) formed on the easily dyeable layer (C) which image has resolution of at least 4 dots/mm and is depicted by an ink-jet system, and a transparent or translucent protective layer (E) on the image; a process for producing the leather-like sheet; and a leather-like sheet for use in depicting an image by an ink-jet system which leather-like sheet comprises a concealing layer (B) and an easily dyeable layer (C) in turn on a fibrous base material (A). The above leather-like sheet has a vivid, precise, fine, abrasion-resistant and high color-fastness image which is depicted by an ink-jet system. Moreover, the above process enables the production of the high-quality leather-like sheet in high productivity without any troublesome procedure or much labor.

11 Claims, No Drawings

LEATHER-LIKE SHEET

BACKGROUND OF THE INVENTION

1. Field of the Invention

The present invention relates to a leather-like sheet having an image depicted with an ink jet system, a process for producing the leather-like sheet, golf gloves formed by the use of the leather-like sheet and a leather-like sheet to be used for depiction by means of an ink-jet system. The present invention also relates to a high-quality leather-like sheet which is excellent in design effects, provided with an image that is precise and fine, vividly depicted, and excellent in abrasion resistance and color fastness, and which can be produced more straightforwardly than before in high productivity at a low cost.

2. Description of the Related Arts

As a method for producing a pattern on an artificial leather, there has heretofore been adopted in general, a method in which a pattern is depicted by means of gravure printing, textile printing, roller printing, transfer printing, hand depicting or the like. However, the method for depicting a pattern by means of gravure printing, textile printing, roller printing, transfer printing or the like makes it necessary, in the case of changing a design or figure, to alter a gravure roll, a textile printing screen, an engraving roll or the like, thereby requiring long hours, much man-hours and great expenses. Moreover, in the case of any of the above-mentioned conventional methods being adopted, it restricts the number of colors, requires much time, labor or experience in color-matching work, or causes a problem in the precision and fineness of the images to be produced. Further in the case of the hand depicting being adopted, it needs highly advanced skill and long hours, thus lowering its productivity to a great extent.

An ink-jet printer has recently been widespread in the field of printing. Different from the conventional gravure printing, textile printing, roller printing, transfer printing or the like as mentioned hereinbefore, the ink-jet printer makes it possible to print precise and fine images and letters on paper or the like by means of multi-color printing in a short time only by modulating and altering the images on a computer. In such circumstances, an attempt has been made to utilize such printing technique by the ink-jet system in a leather raw material. For example, Japanese Patent Application Laid-Open No. 59700/1997 (Hei-9) describes a leather product which is produced by forming an aqueous undercoat layer on a leather raw material such as natural leather, further installing thereon a porous ink receiving layer containing alumina hydrate, depicting images on said porous ink receiving layer by means of the ink-jet system, and installing thereon a protective light-transmittable layer. However, since in the above-mentioned leather product, the ink receptivity (dyeing affinity) of the alumina hydrate to be used in the porous ink receiving layer is insufficient, it is difficult to form an image which is precise, fine, vivid and high in resolution, and further the resultant image is apt to form a color tone without depth, when the above-described method is applied to an artificial leather with grains. In addition, the conventional technique involves the problem that the porous ink receiving layer is liable to falling off due to friction, thus making itself unsatisfactory with regard to abrasion resistance as well. Therefore, the printing technique by means of ink-jet system has not yet been sufficiently put into positive practice in the field of an artificial leather in spite of a variety of advantages including easiness of image change and design, high rate of production and easiness of multi-color printing. Such being the case, it has been sought to develop a technique capable of forming images that are precise, fine, vividly depicted, have favorable depth in color tone, and are excellent in abrasion resistance and color fastness on the surfaces of an artificial Leather by means of an ink-jet system. Nevertheless, the present situation is that such a technique as mentioned above has not yet been achieved.

SUMMARY OF THE INVENTION

An object of the invention is to provide an artificial leather (leather-like sheet) having an image which is depicted by an ink-jet system, is precise, fine, vividly depicted,has depth in color tone and besides, is excellent in abrasion resistance and color fastness.

Another object of the invention is to provide a process for producing the aforesaid artificial leather.

Still another object of the invention is to provide finished products such as gloves formed by the use of the above-mentioned leather-like sheet having an image which has excellent characteristics as mentioned hereinbefore and which is depicted by an ink-jet system.

Further object of the invention is to provide a leather-like sheet which is effectively used for the formation of an image to be depicted by means of an ink-jet system.

Under such circumstances, intensive research and investigation have been accumulated by the present inventors in order to achieve the foregoing objects. As a result, it has been found that it is enabled to readily and steadily produce in high productivity, a leather-like sheet having an image which has high resolution of at least 4 dots/mm, is excellent in precision, fineness and vividness, has depth in color tone, and further is excellent in abrasion resistance and Fastness by a specific method. The method comprises the steps of forming a concealing layer and a specific easily dyeable layer in turn on a fibrous base material; forming an image depicted by an ink-jet system on the easily dyeable layer; and further forming a transparent or translucent protective layer on the image. The present invention has been accomplished by the above-mentioned findings and information.

Specifically, the present invention relates to a leather-like sheet which comprises a fibrous base material (A), a concealing layer (B), an easily dyeable layer (C) each on the fibrous base material (A) in this order, an image (D) formed on the easily dyeable layer (C) which image has resolution of at least 4 dots/mm and is depicted by an ink-jet system, and a transparent or translucent protective layer (E) on the image.

The present invention relates also to a process for producing a leather-like sheet which comprises forming a concealing layer (B) on a fibrous base material (A); forming an easily dyeable layer (C) on the concealing layer (B); forming an image (D) on the easily dyeable layer (C) which image has resolution of at least 4 dots/mm and is depicted by an ink jet system; and forming a transparent or translucent protective layer (E) on the image.

The present invention relates further to a leather-like sheet for depicting an image by means of an ink-jet system which leather-like sheet comprises a concealing layer (B) and an easily dyeable layer (C) in turn on a fibrous base material (A); the easily dyeable layer (C) having an equilibrium absortion of dye, contained in inks used for the ink-jet system, of at least 60 mg/g.

The present invention relates still further to golf gloves produced by using the leather-like sheet having an image depicted by means of an ink-jet system as the material for the side of back of hand and using a suede-like artificial leather as the material for palm side.

DESCRIPTION OF THE PREFERRED EMBODIMENTS

In the following, detailed description will be given of the present invention.

There is usable as the fibrous base material (A) in the present invention, any of the fibrous materials containing, as a base material, a fibrous material which has heretofore been employed in a leather-like sheet (artificial leather). Examples of the fibrous base material (A) to be used in the present invention include a fabric itself such as nonwoven fabric and knitted/woven fabric, a fabric such as nonwoven fabric and knitted/woven fabric which is impregnated with an elastic polymer, a fabric such as nonwoven fabric and knitted/woven fabric which is impregnated with a resin other than an elastic polymer and a fabric such as nonwoven fabric and knitted/woven fabric which is impregnated with an elastic polymer along with an other resin.

The fibrous material such as nonwoven fabric and knitted/woven fabric which constitutes the base of the fibrous base material (A) may be any of synthetic fiber, semi-synthetic fiber, artificial fiber, natural fiber and a combination of at least two of them.

The fiber which constitutes nonwoven fabric or knitted/woven fabric may be any of ultrafine fiber having a single fiber fineness of at most 0.5 denier, thick fiber having a single fiber fineness of at least 0.5 denier and a combination of the both.

Of these, it is preferable in the invention that the fibrous base material (A) be constituted of ultra fine fiber having a single fiber fineness of at most 0.5 denier.

The ultrafine fiber having a single fiber fineness of less than 0.0001 denier is mechanically difficult to obtain.

There is preferably used as the fibrous base material (A) in the present invention, an entangled nonwoven fabric composed of ultrafine fiber with a single fiber fineness of at most 0.5 denier, and is more preferably used as the same therein, a sheet-like product formed by impregnating an entangled nonwoven fabric composed of ultrafine fiber having a single fiber fineness of at most 0.5 denier with an elastic polymer. In the case where use is made of the sheet-like product formed by impregnating an entangled nonwoven fabric composed of ultrafine fiber having a single fiber fineness of at most 0.5 denier with an elastic polymer, as the fibrous base material (A), it is made possible to decrease the layer thickness of the concealing layer (B) which overlays the fibrous base material (A) and also to obtain a leather-like sheet having external appearance and touch further similar to a natural leather, whereby the image depicted by means of an ink-jet system is improved in its precision and fineness and in addition, the resultant sheet is endowed simultaneously with softness, seam strength and tearing strength that are required for sporting gloves and other goods.

The process for producing the ultrafine fiber that is preferably used for the fibrous base material (A) is not specifically limited, but may be selected for use from the conventionally known methods. Examples thereof include ① a method in which at least two types of polymers different from each other in solubility or decomposability are spun by mixed spinning method, composite spinning method of the islands-in-a-sea type fiber, easily separatable-multi-segments type composite spinning method or the like, and the polymer is partially extracted or decomposedly removed to make the resultant ultrafine fiber-generating fiber into ultrafine fiber; ② a method in which synthetic fiber is used to produce a fabric having suede-like structure, and thereafter part of the suede-like portion is removed by decomposing to form ultrafine fiber; ③ a melt blow method in which molten polymer is discharged through spinning nozzles, and immediately thereafter the spun polymer is blown off by spraying a high-speed gas to form ultrafine fiber; and like methods. Of these, the method ① is preferably adopted in which part of the polymer is removed by using the ultrafine fiber-generating fiber, in view of its capability of easily and steadily administrating the thickness of the fiber, and of readily and steadily producing the ultrafine fiber having the objective single fiber fineness.

Typical examples of the polymer component to be left as ultrafine fiber in the ultrafine fiber-generating fiber include polyesters having an aromatic ring such as polyethylene terephthalate and polybutylene terephthalate, poly) amides such as nylon 6 and nylon 66, and polyolefins such as polyethylene and polypropylene. The above mentioned polymer is preferably used alone or in combination with at least one other. Needless to say, a fiber-formable polymer other than the above can also be used.

Typical examples of the polymer component to be extracted or decomposedly removed in the ultrafine fiber-generating fiber include polyethylene, polypropylene, ethylene/propylene copolymer, ethylene/vinyl acetate copolymer, polystyrene, styrene/acrylonitrile copolymer and styrene/ethylene copolymer. The aforesaid polymer is preferably used alone or in combination with at least one other. However, polymers other than the above can also be used as a polymer to be extracted or decomposedly removed.

A process for producing a fibrous sheet, particularly an entangled nonwoven fabric, from ultrafine fiber by using ultrafine fiber-generating fiber is exemplified by (i) a method in which an entangled nonwoven fabric is produced by using ultrafine fiber-generating fiber, and thereafter part of the polymer component constituting the ultrafine fiber-generating fiber is extracted or decomposedly removed to form ultrafine fiber; (ii) a method in which part of the polymer component constituting the ultrafine fiber-generating fiber is extracted or decomposedly removed to form ultrafine fiber, and thereafter an entangled nonwoven fabric is produced by using the resultant ultrafine fiber; and like methods. Of these, the aforesaid method (i) is preferably adopted in view of its proccessability at the time of producing the entangled nonwoven fabric, easiness of ultrafine fiber formation and uniformity of the resultant ultrafine fiber.

In the case of adopting the aforesaid method (i), the ultrafine fiber formation step may be put into practice before or after the impregnation of an elastic polymer or the like into the entangled nonwoven fabric formed from the ultrafine fiber-generating fiber. However, it is preferable to adopt the procedure in which the ultrafine fiber formation step is effected after the impregnation of an elastic polymer or the like in view of easiness of impregnation work, uniformity in the impregnation of an elastic polymer or the like and the flexibility of the resultant leather-like sheet.

A process for producing the entangled nonwoven fabric by using ultrafine fiber-generating fiber, is not specific ally limited, but may be selected from the conventional known methods. For example, the fabric can be produced by a method in which the ultrafine fiber-generating fiber is subjected to stretching, thermal fixing, cutting, opening treatment or the like to produce raw fiber, then the resultant raw fiber is opened with a carding machine, the opened product is formed into random webs or close lap webs with a waving machine, the resultant webs are laminated in plural numbers at need to obtain a desired thickness or basis weight (Metsuke), and the web or web laminate is subjected to an entanglement treatment by a conventional means. The basis weight (Metsuke) of the web or web laminate prior to the entanglement treatment, varies depending upon the purpose of use of the leather-like sheet according to the present invention. The basis weight is preferably in the range of 100 to 3000 g/m$^2$ judging from the likelihood of its feeling similar to natural leather and smooth proceeding in the production steps.

The entanglement treatment of the web or web laminate can be effected by any of conventional known methods such as needle punching method and high pressure water jet method. In the case of entanglement treatment by means of needle punching method, the number of punchings and punching conditions vary depending upon the needles to be used and the thickness of the web. In general, a punching condition including 200 to 2500 punches/cm$^2$ is prefereably adopted.

In the case where use is made of a fabric such as nonwoven fabric or knitted/woven fabric impregnated with an elastic polymer, particularly entangled nonwoven fabric which is impregnated with an elastic polymer and composed of ultrafine fiber-generating fiber, it is possible to employ, as an elastic polymer to be impregnated into the fabric, one or more kinds of elastic polymers selected from a variety of synthetic rubber, thermoplastic elastomers and natural rubber. Of these, elastic polyurethane (polyurethane elastomer) is preferably used as an elastic polymer to be impregnated into the fabric, in view of the improvemet in feeling of the leather-like sheet to be obtained, abrasion resistance and restorability of elasticity.

There is preferably used, as an elastic polyurethane to be impregnated into the fabric, segmented polyurethane which is obtained by reacting a diisocyanate compound and a low molecular-weight chain extender with one or more polymer diols that are used as a soft segment component, and are selected from polyester diol, polylactone diol, polycarbonate diol and polyether diol, said diols being produdced by the reaction between a diol compound and a dicarboxylic acid or an ester-formable derivative thereof.

Preferably, the above exemplified polymer diols to be used for producing the elastic polyurethane, have a number-average molecular weight in the range of 500 to 5000. The number-average molecular weight of the polymer diols, when being less than 500, results in insufficient flexibility of the resultant polyurethane, and eventually leads to high likelihood of failure to obtain a leather-like sheet having feeling similar to natural leather. On the other hand, the number-average molecular weight of the polymer diols, when being more than 5000, leads to a decrease in the concentration of the urethane groups, thereby bringing about high likelihood of failure to obtain a leather-like sheet having balanced properties in flexibility, durability, heat resistance, hydrolysis resistance, etc.

In the case where polyester diol is used as a polymer diol, the use of one or more diol compounds having 6 to 10 carbon atoms as the aforesaid diol compound for forming the polyester diol, can produce a leather like sheet having favorable durability and leather-like feeling. The diol compounds having 6 to 10 carbon atoms are exemplified by 3-methyl-1,5-pentanediol, 1,6-hexanediol, 2-methyl-1,8-octanediol, 1,9-nonanediol and 1,10-decanediol. Typical examples of the above-mentioned dicarboxylic acid and an ester-formable derivative thereof include aliphatic dicarboxylic acids such as succinic acid, glutaric acid, adipic acid, azelaic acid, sebacic acid; aromatic dicarboxylic acids such as terephthalic acid and isophthalic acid; and ester-formable derivative thereof. The dicarboxylic acid or an ester-formable derivative thereof may be used alone or in combination with at least one other.

As the aforestated diisocyanate compounds to be used for the production of the elastic polyurethane, there are usable any of aromatic diisocyanate compounds, aliphatic diisocyanate compounds and alicyclic diisocyanate compounds, which are specifically exemplified by 4-4'-diphenylmethane diisocyanate, tolylene diisocyanate, phenylene diisocyanate, tolidine diisocyanate, naphthalene diisocyanate, xylylene diisocyanate, hexamethylene diisocyanate, isophorone diisocyanate, dicyclohexylmethane diisocyanate and hydrogenated xylylene diisocyanate. Any of the diisocyanate compound may be used alone or in combination with at least one other.

As the aforestated low molecular-weight chain extender to be used for the production of the elastic polyurethane, there are usable any of low molecular-weight diols having two active hydrogen atoms and low molecular-weight diamines, which are specifically exemplified by ethylene glycol, propylene glycol, butanediol, hexanediol and ethylenediamine.

The elastic polyurethane to be impregnated into a fabric may contain at need, pigments, dyes, coagulation controlling agents, stabilizing agents and the like.

The method for impregnating the elastic polymer into a fabric is not specifically limited. There are adoptable a method in which a solution of an elastic polymer is impregnated into a fabric and a method in which melt of an elastic polymer is impregnated into a fabric. In general, there is preferably adopted the method in which a solution of an elastic polymer is impregnated into a fabric in view of the balance of feeling. Examples of the impregnating method in this case include a method in which a fabric is immersed in a solution of an elastic polymer, a method in which a solution of an elastic polymer is applied onto a fabric by means of spraying, coating with a roller, casting or the like.

The impregnation amount of the elaslic polymer into the fabric is preferably in the range of 30:70 to 80:20, more preferably 40:60 to 55:45 expressed in terms of the ratio by weight of the fabric to the elastic polymer in order to impart a soft feeling inherent in natural leather to the leather-like sheet according to the present invention. The impregnation amount of the elastic polymer into the fabric, when being unreasonably large, brings about high likelihood of unfavorable rubbery feeling. It is possible in the present invention to use a fabric not impregnated with an elastic polymer as a fibrous base material (A). However, a fabric not impregnated with an elastic polymer sometimes gives rise to a leather-like sheet having unfavorable paper-like feeling depending upon the type or form of the fabric to be used. It is therefore, preferable to impregnate an elastic polymer thereinto or regulate the impregnation amount of the elastic polymer in accordance with the type or form of the fabric.

The fabric impregnated with an elastic polymer is coagulated, solidified or cured. It is possible to adopt a method for coagulating, solidifying or curing the elastic polymer according to the type or form thereof. For example, a solution of an elastic polyurethane, when being impregnated thereinto, can be made into coagulated elastic polyurethane by wet coagulation method or dry coagulation method. A molten elastic polymer, when being impregnated thereinto, can be solidified after impregnation, by lowering the temperature to the melting point of the elastic polymer or lower. An elastic polymer curable by vulcanization or crosslinking, when being impregnated thereinto, is cured after impregnation by vulcanization or crosslinking.

In regard to a fabric impregnated with an elastic polymer formed after the elastic polymer is coagulated, solidified or cured, in the case where the fabric is constituted of ultrafine fiber-generating fiber, the ultrafine fiber-generating fiber constituting the fabric is made into ultrafine fiber without dissolving or decomposing the elastic polymer or part of the polymer components in the ultrafine fiber-generating fiber, by a method wherein the nonwoven fabric impregnated with the elastic polymer is treated with a solvent or a decomposing agent capable of dissolving or decomposing the other part of polymer components in the ultrafine fiber-generating fiber to remove part of polymer components in the ultrafine fiber-generating fiber. Because of its excellent flexibility, strength, touch and feeling, the thus obtained fabric which is constituted of the ultrafine fiber and is impregnated with the elastic polymer, is favorably used as the fibrous base material (A) in the leather-like sheet of the invention.

The thickness of the fibrous base material (A) to be used in the leather-like sheet according to the present invention, is not specifically limited, but can be regulated according to the purpose of use of the leather-like sheet or the like. The thickness thereof is in the range of preferably 100 $\mu$m to 3 mm, more preferably 300 $\mu$m to 2.5 mm judging from the viewpoint of flexibility, dynamical characteristics and unit weight of the leather-like sheet to be obtained.

The leather-like sheet in accordance with the present Invention is equipped with the foregoing concealing layer (B) on the surface of the fibrous base material (A). The concealing layer (B) is intended to conceal unevenness in color and fabric (such as unevenness due to fiber) on the fibrous base material (A), thus enabling an image by an ink-jet system to be depicted vividly, precisely and finely. Preferably, the concealing layer (B) is composed of an organic polymer or an organic polymer composition each imparted with pliability in order to obtain a leather-like sheet having sufficient pliability and flexibility. A pliable organic polymer constituting the concealing layer (B) may either be an elastic polymer or a non-elastic polymer. Examples of such organic polymer include synthetic rubber such as polybutadiene, polyisoprene, polychloroprene, SBR and NBR; natural rubber; elastomers such as elastic polyurethane, polystyrene base thermoplastic elastomer, polyolefin base thermoplastic elastomer, polyester base thermoplastic elastomer, polyamide base thermoplastic elastomer; halogenated polymer such as polyvinyl chloride, vinyl chloride/vinyl acetate copolymer and polyvinylidene chloride; olefinic polymer such as polyethylene, polypropylene, ethylene/vinyl acetate copolymer, polyisobutylene and ethylene/methyl methacrylate copolymer; acrylic polymer; polyvinyl alcohol base polymer; polyester such as polyethylene terephthalate and polybutylene terephthalate; and polyamide such as nylon-6 and nylon-66.

Preferably, the concealing layer (B) is composed of the elastic polymer such as rubber, an elastomer or a composition of said elastic polymer, since such constitution enables to obtain a leather-like sheet having excellent flexibility.

In particular, in the case of using a fabric impregnated with an elastic polyurethane as the fibrous base material (A), preferably, the concealing layer (B) is composed of an elastic polyurethane or a composition thereof, since such constitution enhances the affinity between the fibrous base material (A) and the concealing layer (B), prevents interlaminar peeling or the like, and causes uniform feeling, favorable touch and bending crimp of integral feeling.

The color of the concealing layer (B) is not specifically limited, but may be determined according to the color tone of the image depicted by an ink-jet system, type of the pattern and the purpose of use of the leather-like sheet. In general, the color of the concealing layer (B) is preferably white color or light color, more preferably white color. The white color or light color of the concealing layer (B) enables an ink-jet system to depict a vivid, precise and fine image, magnify the degree of freedom in selecting ink color, and increase the number of ink colors.

The the concealing layer (B) may be a non-porous, porous or foamed layer. In the case where the concealing layer (B) is a foamed or porous layer, it is made possible to increase the whiteness of the concealing layer (B), since the light transmission through the fibrous base material (A) is suppressed by the diffuse reflection due to foamed or porous portion. The concealing layer (B) can be made into a foamed or porous layer by adopting any of the conventional known foaming methods (porosity-generating method) including wet foaming method (wet porosity-generating method), dry foaming method (dry porosity-generating method) and heat-sensitizing foaming method in accordance with the type of the organic polymer constituting the concealing layer (B).

In the case where a foamed or porous layer is used as the concealing layer (B), the void in this layer is preferably 20 to 80% by volume. A void of less than 20% by volume brings about a low concealing effect, whereas a void of more than 80% by volume unfavorably results in deterioration of mechanical properties of the concealing layer (B) typified by the strength thereof. In the case where the fibrous base material (A) is composed of a fabric or a knitted product, a foamed or porous layer is preferably used as the concealing layer (B) in order to eliminate the unevenness in the fibrous base material (A). In the case where the fibrous base material (A) is composed of a nonwoven fabric composed of ultrafine fiber, a non-porous layer containing white powders is preferably used as the concealing layer (B) in order to achieve more leather like feeling.

It is possible to increase the whiteness of the concealing layer (B) composed of a non-porous, porous or foamed layer by adding thereto, white powders such as white and organic, inorganic or metallic powders which inhibit light transmission. Typical examples of the white powders to be contained in the concealing layer (B) include titanium oxide, silicon oxide, zinc oxide, lithopone, calcium carbonate and barite. Of these, titanium oxide and silicon oxide are preferable.

White powders, when being contained in the concealing layer (B), is contained in an amount of preferably 50 to 300%, more preferably 50 to 200% by weight based on the organic polymer constituting said layer. The amount of the white powders contained in the concealing layer (B), when being unreasonably large, causes a decrease in the strength of the concealing layer (B) and also in the interlaminar adhesion strength between the concealing layer (B) and the fibrous base material (A) or the easily dyeable layer (C) in spite of the concealing effect being enhanced thereby.

The thickness of the concealing layer (B) can be regulated according to the thickness of the fiber constituting the fibrous base material (A), basis weight, color tone and thickness of the material, and the type, color tone, etc. of the organic polymer constituting the layer (B).

The thickness of the concealing layer (B) is usually in the range of preferably 5 to 600 $\mu$m, more preferably 20 to 300 $\mu$m.

The thickness of the concealing layer (B), when being less than 5 μm, necessitates an extreamely large amount of the white powders to be added thereto in order to attain the concealing effect, thereby markedly lowers the interlaminar peeling strength. On the other hand, the thickness thereof, when being more than 600 μm, causes failure to assure the natural leather feeling. In the case where the concealing layer (B) is composed of a foamed or porous layer in particular, the thickness of the concealing layer (B) is in the range of preferably 30 to 600 μm, more preferably 100 to 300 μm. In the case where the concealing layer is composed of a non-foamed or non-porous layer in particular, the thickness of the concealing layer (B) is in the range of preferably 5 to 100 μm, more preferably 10 to 50 μm.

The concealing layer (B) may be partially impregnated into the fibrous base material (A).

The concealing layer (B) may be installed on either side or both the sides of the fibrous base material (A), but is generally installed on either side thereof.

A method for mounting the concealing layer (B) on the fibrous base material (A) may be any method, provided that the concealing layer (B) can be uiformly mounted on the fibrous base material (A). For example, the concealing layer (B) can be mounted by coating the surface of the fibrous base material (A) with a solution or melt of an organic polymer or a composition thereof which is intended to form the layer through a suitable coating method such as roller coating, spray coating, curtain flow coating, extruder coating or brush coating, and then subjecting the coated layer to drying, coagulation, solidification or curing.

In the case of forming a foamed or porous concealing layer (B), there is available a method in which the fibrous base material (A) is coated with an organic polymer or a composition thereof which is intended to form the layer, arid thereafter or simultaneously therewith the coated layer is made into foamed or porous layer by wet foaming method (wet porosity-generating method), dry foaming method (dry porosity-generating method), heating foaming method or like method. In the case where, for example, the concealing layer (B) composed of foamed elastic polyurethane is formed on the fibrous base material (A), the layer can be formed by coating the fibrous base material (A) with a solution of the elastic polyurethane in a solvent, and then pouring or spraying the coated product into or with water for wet solidification and simultaneous foaming.

In forming the concealing layer (B) on the fibrous base material (A), the surface of the fibrous base material (A) to be in contact with the layer (B) may be roughened in advance to some extent.

Subsequently, the easily dyeable layer (C) is installed on the above concealing layer (B). The easily dyeable layer (C) is intended to enhance the dyeing affinity of ink and enable a vivid, precise and fine image to be depicted by an ink-jet system. For this purpose, the equilibrium absorption amount of dye, contained in the ink, of the easily dyeable layer (C) is preferably at Least 60 mg/g, more preferably at least 80 mg/g. An equilibrium absorption amount of dye of the easily dyeable layer (C) being at least 60 mg/g enables a vivid, precise and fine image to be depicted on the easily dyeable layer (C) by an ink-jet system having a resolution (number of dots) of at least 4 dots/mm (100 dots/inch). On the contrary, an equilibrium absorption amount of dye of the easily dyeable layer (C), when being less than 60 mg/g, brings about such disadvantages that ink repellance is caused at the time of image depiction by an ink-jet system due to low affinity between the ink and the easily dyeable layer (C), and makes it impossible to obtain a vivid, precise and fine image. Moreover, ink peeling from the easily dyeable layer (C) is caused thereby in the drying step after the image depiction by an ink jet system and also in the subsequent step of installing the protective layer (E).

When the equilibrium absorption amount of dye is more than 250 mg/g, more excellent deep color is not obtained, thus said amount of dye is preferably less than 250 mg/g.

By the term "equilibrium absorption amount of dye, contained in the ink, of the easily dyeable layer (C)" as used herein is meant the absorption capability (absorption amount) of the material (generally, polymer or composition thereof) constituting the easily dyeable layer (C), the absorption amount being defined by the amount of the coloring agent (dye) absorbed by the material up to the equilibrium state (saturation state). The equilibrium absorption amount of dye, contained in the ink, of the easily dyeable layer (C) is obtained by a procedure wherein a sheet having a thickness of 100 μm is made from a polymer or a composition thereof, the resultant sheet is immersed in the coloring agent to be contained in the ink until the absorption of the coloring agent in the sheet reaches the equilibrium state, the sheet is taken out from the coloring agent at the point of time of the equilibrium, a measurement is made of the weight of the coloring agent absorbed in the sheet, and the weight thus obtained is converted to an absorption amount per one gram of the sheet.

The easily dyeable layer (C) is composed of a material which is excellent in both flexibility and dynamical characteristics such as mechanical strength, has high affinity for the concealing layer (B), and does not peel off nor fall off from the leather-like sheet. As a material constituting the easily dyeable layer (C), there are preferably used in genaral, an organic polymer material having excellent ink adsorptivity and flexibility, especially an organic polymer material which has in its molecule, a group having affinity for the coloring agent in the ink, an organic polymer material which contains an additive having affinity for the coloring agent in the ink and the like.

It is preferable to select the types and amounts, etc. of an organic polymer constituting the easily dyeable layer (C) and the types and amounts, etc. of an additive which is contained in the polymer and which has affinity for the coloring agent in the ink, in accordance with the type of the ink and the type of the coloring agent in the ink.

As a coloring material, there is used a well-known dye base ink which is used for ink-jet coloring. In the case where the easily dyeable layer (C) comprises polyurethane, there are used, as a dye, an acid dye, a direct dye, a disperse dye or the like, preferably an acid dye, particularly preferably a metallic complex dye in view of vividity and fastness of the color.

In the case where the coloring material contained in an ink jet is acidic, the easily dyeable layer (C) is preferably constituted of an organic polymer having a basic group or an organic polymer which contains an additive having a basic group; whereas in the case where the coloring material contained in an ink jet is basic, the easily dyeable layer (C) is preferably constituted of an organic polymer having an acidic group or an organic polymer which contains an additive having an acidic group.

In the case where an acid dye typified by a metallic complex dye is used as a coloring material, the easily dyeable layer (C) is preferably polyurethane, more preferably either polyurethane which has a nitrogen content of 3 to 7%, preferably 3.5 to 6% by weight and which is formed by reacting a soft segment component comprising at least 30% by weight of polyethylene glycol with a diisocyanate compound and a low molecular weight chain extender, or polyurethane in which a tertiary nitrogen compound typified by N-methyltdiethanolamine is used as part of a soft segment component or part of a chain extender, and which has a content of the tertiary nitrogen compound of at least $1.0\times10^{-4}$ mol, preferably $1.2\times10^{-4}$ to $1.0\times10^{-3}$ in 1 g of the polyurethane and a nitrogen content of 3 to 7%, preferably 3.5 to 6% by weight. A nitrogen content, when being less than 3%, brings about deterioration of physical properties typified by strength; whereas when being more than 7%, results in inferior easy-dyeability. In particular, polyurethane which has a nitrogen content of 3.5 to 6% by weight and which is formed by reacting a soft segment component comprising at least 50% by weight of polyethylene glycol with a diisocyanate compound and a low molecular weight chain extender, is suitable for the object of the invention in view of vividness of coloring and physical properties.

The nitrogen content is the ratio in % by weight of nitrogens of isocyanate groups constituting the diisocyanate compound employed to produce the polyurethane elastomer to the total weight of the elastomer. For example, the nitrogen content of a polyurethane elastomer produced by the reaction among 1 mole of polyethylene glycol (number-averaqe molecular weight; 2000), 4 moles of diphenyl-methanedi isocyanate (molecular weight; 250) and 3 moles of ethylene glycol (molecular weight; 62) is $\{14\times2\times4/(2000+250\times4+62\times3)\}\times100=3.5\%$.

The thickness of the easily dyeable layer is generally in the range of preferably 5 to 80 $\mu$m, more preferably 10 to 40 $\mu$m from the viewpoint of color producibility and mechanical properties. The color of the easily dyeable layer (C) is not specifically limited, but may be determined according to the color tone, kind and content of an image depicted by an ink-jet, the color of the concealing layer (B) and the like. In general, the color of the easily dyeable layer (C) is preferably white, light, transparent or translucent, more preferably transparent or white. In the case of the easily dyeable layer (C) being not transparent, the color of said layer (C) is preferably the same as that of the concealing layer (B), since an image by an ink-jet is clearly finished in this case.

A method of forming the easily dyeable layer (C) may be any method without specific limitation provided that the easily dyeable layer (C) can be formed uniformly on the concealing layer (B). For example, the easdily dyeable layer (C) can be formed by a method in which a solution or melt liquid of an organic polymer or a composition thereof is applied to the surface of the concealing layer (B) by a suitable coating method such as roller coating, spray coating, curtain flow coating, extruder coating or brush coating, and thereafter the resultant coated layer is coagulated, dried or solidified.

As a method for installing the concealing layer (B) and the easily dyeable layer (C) on the surface of the fibrous base material (A) in the present invention, a transfer method may be adopted in addition to the aforesaid methods. The transfer method is specifically exemplified by (1) a method in which a material for forming the concealing layer (B) is applied on the surface of a sheet of releasing paper to form a layer, the resultant layer is transferred on the fibrous base material (A) to form the concealing layer (B) on the fibrous base material (A), and the easily dyeable layer (C) is formed thereon by transfer method or an other method; and (2) a method in which a material for forming the easily dyeable layer (C) is applied on the surface of a sheet of releasing paper to form a layer, then a material for forming the concealing layer (B) is applied thereon to form a layer, and the resultant layer is transferred on the fibrous base material (A) by bringing the layer into contact with the fibrous base material (A) to simultaneously form the concealing layer (B) and the easily dyeable layer (C) on the fibrous base material (A). In the case of forming the concealing layer (B), or forming the concealing layer (B) and the easily dyeable layer (C) on the fibrous base material (A) by means of transfer, an adhesive may be used so that the transfer is carried out favorably and firmly.

Subsequently, an image depicted by an ink-jet system is formed on the easily dyeable layer (C) of the resultant laminate comprising the fibrous base material (A), the concealing layer (B) and the easily dyeable layer (C). The image depiction by an ink-jet system can be put into practice by using a monochrome or multicolor according to the type of the objective image and the like. The type and detail of the image can be optionally selected and determined wihout any limitation, and may be any of letters, design, figure, patterns and picturesque patterns.

The image is generally formed with an ink-jet printer, which receives the data sent from a computer in an image development unit at real time, and prints an image (D) on the easily dyeable layer (C). It is possible at this time to suitably select, alter and modulate the image (D) to be depicted on the easily dyeable layer (C), by inputting, in a computer, the data (original image arid the like) sent from a scanner, CD-ROM or the Like, and treating the data on the computer freely at will. Thus it is made possible to print vivid, precise, fine and arbitrary image (D) on the easily dyeable layer (C) within a minimized period of time in high productivity through a continuous or batchwise system, by virtue of the image formation on the easily dyeable layer (C) with an ink-jet printer.

It is important that the image has a resolution of at least 4 dots/mm to achieve the precise and fine image. The image having more than 50 dots/mm is mechanically difficult.

The image (D) thus formed by an ink-jet system may be dried as such at a low temperature, but is preferably heat-treated usually at 50 to 130° C., whereby the image (D) {coloring agent} on the easily dyeable layer (C) is fixed.

Subsequently a protective layer (F) is constituted on the image (D) formed in the above manner. The protective layer (E) has functions of covering the entire surfaces of forming the image (D) with a transparent or traslucent protective layer, of preventing the image (D) from being peeled or damaged, of imparting gloss feeling to the surface, and of modulating the color tone. The protective layer (E) may be a colorless and transparent or translucent layer, and alternatively it may be a colored and transparent or translucent layer.

There is used as a material for forming the protective layer (E), a transparent or translucent material which is excellent in flexibility and dynamical characteristics such as mechanical properties, has high affinity for the material forming the image (D) and the easily dyeable layer (C), and does not peel off nor fall off from the leather-like sheet. In general, the protective layer (E) is preferably formed from a transparent or translucent and flexible organic polymer. There are usable a transparent or translucent elastomer and a pliable resin as the organic polymer material for the protective layer (E). Specific examples of the organic polymer material include elastomers typified by elastic polyurethane, polyester, polyamide, polyvinyl chloride, polyvinylidene chloride, polyethylene, polyvinyl alcohol and polypropylene. In particular, in the case where the leather-like sheet according to the present invention is constituted by impregnating a fabric with polyurethane to form the fibrous base material (A) and forming thereon the concealing layer (B) composed of polyurethane and the easily dyeable layer (C) composed of polyurethane, there is obtainable a high-quality leather-like sheet which is free from interlaminar peeling, is excellent in flexibility, and further resembles natural leather through the formation of the protective layer (E) by the use of polyurethane.

In particular, it is preferable to use a two-component type crosslinkable polyurethane to form the protective layer (E) in view of surface abrasion resistance, damage resistance and long-term preservability of vividness for the pattern colored by an ink-jet. The two-component type crosslinkable polyurethane comprises as one liquid, (1) a solution of polyurethane which is produced by reaction among a high molecular diol, a diisocyanate compound and a chain extender; and as the other liquid, (2) a solution of a polyisocyanate crosslinking agent. Immediately prior to use, the two liquids (1) and (2) are mixed, the resultant mixture is used as the coating agent, and the coating is heated to vaporize the solvent, while the two liquids are reacted into crosslinked polyurethane. Examples of the high molecular diol constituting the liquid (1) include polyester diol, polyether diol, polyester-ether diol, and polycarbonate diol. Of these, the polycarbonate diol is preferable because of its excellent light resistance. The diisocyanate compound may be any of an aliphatic diisocyanate, an alicyclic diisocyanate and an aromatic diisocyanate. In the case of concealing layer (B) being white-color or light-color, the use of an aliphatic or alicyclic diisocyanate is preferable in view of preserving the white-color or light-color for a long period of time. Examples of the chain extender include a low melecular weight compound having two active hydrogen atoms typified by a low molecular diol such as ethylene glycol and butanediol. Preferable examples of the polyisocyanate crosslinking agent constituting the liquid (2) include an adduct of an at least tri-valent compound containing at least 3 active hydrogen atoms typified by trimethylolpropane with diisocyanate compounds typified by tolylenediisocyanate, 4,4'-methylenebis (cyclohexylisocyanate) and isophorone diisocyanate. The preferable use amount of the liquid (2) expressed in terms of solid content and based on the liquid (1) is in the range of 5 to 75% by weight based on polyurethane of the liquid (1).

As a favorable method for use of such two-component type polyurethane, there is available a method in which the mixed liquid of the liquids (1) and (2) is applied in advance on release paper; the coated paper is heated to evaporate away most of the solvent in the mixed liquid, then laminated onto the easily dyeable layer (C) on which an image (D) is depicted, while part of the mixed liquid remains non-evaporated and preserves adhesiveness under non-crosslinked condition; the laminate is heated to crosslink the molecules of the polyurethane in the liquid (1), and also to cause crosslinking reaction between the polyurethane in the liquid (1) and the polyurethane constituting the easily dyeable layer (C); still remaining solvent is completely evaporated away; and thereafter the release paper is peeled. The use of the aforesaid method minimizes the likelihood of the problem that the dyestuff constituting the image (D) dissolves into the solvent when the protective layer is formed with the result that the image is made fuzzy, since almost all the solvent in the protective layer (E) is evaporated away at the point of time when the protective layer (E) is laminated onto the image (D).

The thickness of the protective layer (E) can be modulated according to the type of the organic polymer, the purpose of use of the leather-like sheet and the like. In general, the thickness thereof is in the range of preferably 5 to 60 $\mu$m, more preferably 10 to 30 $\mu$m in order that the protective function is fully exhibited and the flexibility of the leather-like sheet is not impaired.

A method of forming the protective layer (E) can be carried out by a conventional method without specific limitation, and is exemplified by a method in which coating of a solution of an organic polymer or a composition thereof in a solvent for forming the protective layer (E), is applied by means of roller coating, spray coating, curtain flow coating, extruder coating, gravure coating, reverse coater coating or the like, a method in which an image (D) is covered with a transparent film which has been prepared or ready to prepare in advance, and the like methods.

The foregoing procedure enables the preparation of the leather-like sheet of the invention which comprises the fibrous base material (A), the concealing layer (B) and the easily dyeable layer (C) that are placed on the material (A) in turn, the image (D) which is laid on said layer (C), is depicted by an ink-jet system, and has a resolution of at least 4 dots/mm, and the transparent or translucent protective layer (E) on the image (D).

The leather-like sheet of the invention may comprise the concealing layer (B), the easily dyeable layer (C), the image (D), and the protective layer (E) on either side or both sides of the fibrous base material (A). The leather-like sheet of the invention, which is a leather-like sheet having the protective layer (E) as grain layer, possesses a vivid, precise and fine image which is depicted by an ink-jet system. In addition, the image is excellent not only in design effect but also in abrasion resistance and color fastness, and maintains its satisfactory condition for a long period of time without being abraded, damaged or peeled even on folding. By making full use of the aforesaid characteristics and advantages, the leather-like sheet according to the present invention can effectively be used in a wide range of applications including clothes such as coat, suits, outer wear, skirt, trousers and shirt; apparel products such as necktie, scarf and belt; bag and foot gear; interior products such as curtain, wall paper, table cloth, tapestry, sheets and cover; art/POP products such as museum goods, poster, calendar, hanging screen, photograph and display; sporting goods such as golf gloves, swimming wear, snow board wear, ski wear, golf wear and tennis wear; sporting balls such as soccer ball, volleyball ball; sporting shoes such as golf shoes; furniture such as sofa; automobile goods such as car seat. In particular, when an attempt is made to produce golf gloves by the use of the leather-like sheet according to the present invention, there are obtainable golf gloves that are excellent in ornamental effect and also in the essential functions as the golf gloves including gripping properties, strength and feeling incorporate with hands, by the use of the present leather-like sheet as the material for back of hand, while suede-like artificial leather is used as the material for palm to produce the objective golf gloves.

Conventional techniques, when applied to the depiction of patterns on a leather-like sheet (artificial leather) by means of gravure printing, textile printing, roller printing, transfer, hand writing or the like, requires a great deal of labor, hours and expenses in the exchange or alteration of a gravure roll, textile printing screen, engraving roll or the like. As opposed to the foregoing, the invention enables a desired image to be printed on a leather-like sheet extreamly simply, freely at will with high productivity in a short period of time, only by selecting, altering and modulating an image to be depicted on a computer of an image development unit which is connected to an ink-jet printer.

In the following, the present invention will be described in more detail with reference to comparative examples and working examples, which however shall never limit the present invention thereto. All part/parts and percentages (%) given throughout the specification are based on weight unless otherwise indicated.

In the following working examples and comparative examples, the equilibrium absorption amount of dye, contained in the ink, of the easiy dyeable layer (C) was measured in the following manner. [Equilibrium absorption amount of dye, contained in the ink, of the easiy dyeable layer (C)]

A dye (red dye produced by Ciba Geigy Inc. under the trade name "Ingaran read 2GL") was dissolved in water to prepare a dye bath having a concentration of 0.05%. In the resultant dye bath was immersed a sheet with a thickness of 100 $\mu$m produced From a polymer (polyurethane) to be used in the easiy dyeable layer (C) at a bath ratio of 1:200 at 90° C. for 60 minutes to dye the sheet. After the dyeing, the sheet was taken out from the dye bath, the remaining liquid (dye bath) was subjected to colorimeric determination to measure the amount of the dye remaining in the dye bath, and the equilibrium absorption amount of dye was obtained from the following formula.

Equilibrium absorption amount of dye (mg/g) of the easily dyeable layer (C)=$(F_0-F_1)/W$ where $F_0$=amount of the dye contained in the dye bath prior to immersion of the sheet (mg)

$F_1$=amount of the dye remaining in the dye bath after immersion of the street (mg)

W=weight of the sheet immersed in the dye bath (g)

EXAMPLE 1

(1) Preparation of Fibrous Base Material (A)

(i) Nylon 6 and polyethylene were mixed at a ratio by weight of 50:50, fed to an extruder, subjected to mixed melt spinning, then stretched and cut to produce short fibers which had a single fiber fineness of 4 denier and a fiber length of 51 mm and islands-in-a-sea type fibers wherein nylon 6 was the island component and polyehylene was the sea component.

(ii) By the use of the short fibers, cross lap was prepared with a waver, and was subjected to needling by using a needle punching machine at 1500 punches/cm$^2$ to prepare an entangled nonwoven fabric having a Metsuke (basis weight) of 510 g/m$^2$.

(iii) The entangled nonwoven fabric obtained in the preceding item (ii) was impregnated with a solution of polyurethane in dimethylformamide having 13% concentration, which polyurethane had been produced by the reaction among a polymer diol with a number-average molecular weight of 2000 composed of polymethylpentaneadipatediol and ethylene glycol; 4,4'-diphenylmethanediisocyanate; and butanediol, and thereafter the fabric was immersed in water for wet coagulation.

(iv) The polyurethane-impregnated entangled nonwoven fabric obtained in the preceding item (iii) was treated with tolylene to extract away the sea component in the islands-in-a-sea type fibers constituting the entangled nonwoven fabric, and was dried to prepare a fibrous base material (A) having a thickness of 1.2 mmm and a Metsuke of 420 g/m$^2$. A measurement was made of the average-single fiber fineness of nylon 6-ultrafine fiber constituting the fibrous base material (A) by means of an scanning electron microscope. The result was 0.006 denier. The ratio by weight of the fiber to polyurethane in the fibrous base material (A) was 60:40.

(2) Preparation of Concealing Layer (B)

(i) The fibrous base material (A) obtained in the preceding item (1) was horizontally divided into two thinner sheets at the middle of the thickness line, and the divided surfaces were buffed with sand paper to produce two sheets each having a thickness of 0.5 mm.

(ii) The surfaces opposite to the divided surfaces of the sheet obtained in the preceding item (i) was coated with polyurethane solution the chemical composition of which is shown in Table 1 by the use of a knife coater, and was dried at 70° C. to produce a white concealing layer (B) having a thickness of 45 $\mu$m.

TABLE 1

Chemical Composition of Polyurethane Solution for forming Concealing Layer (B)

| | |
|---|---|
| Polyurethane (polyether base polyurethane, produced by Dainichiseika Colour & Chemicals Mfg. Co., Ltd. under the trade name "Rezamine ME 8105" having solid concentration of 30% by weight | 100 parts |
| Titanium oxide (produced by Dainichiseika Colour & Chemicals Mfg. Co., Ltd. under the trade name "Seika Seven DUT-09-850" | 30 parts |
| Dimethylformamide | 40 parts |
| Methyl ethyl ketone | 40 parts |

(3) Preparatin of Easily Dyeable Layer (C)

The open surface of the concealing layer (B) formed in the poreceding item (2) was coated with 10% solution of polyurethane in dimethylformamide, which polyurethane had been produced by the reaction among polyethylene glycol, diphenylmethane diisocyanate (MDI) and ethylene glycol and had a nitrogen content of 4%, by the use of a knife coater, and was dried at 100° C. to prepare an easily dyeable layer (C) having a thickness of 15 $\mu$m. Then, a measurement was made of the equilibrium absorption amount of dye of the easily dyeable layer (C) by the above-described method. The result was 97.5 mg/g.

(4) Image Formation by Means of an Ink-Jet Printer

Geometric patterns were printed on the open surface of the easily dyeable layer (C) formed in the poreceding item (3) at 360 dots/inch by using four kinds of acid dye-based inks including red, blue, yellow and black with an ink-jet printer (produced by Canon Inc. under the trade name "Bubble Jet Printer BJC 445J"), and was heat-treated in a dryer at 80° C. for 5 minutes to fix the ink.

(5) Preparation of Protective Layer (E)

(i) The image-depicted surface of the sheet in the preceding item (4) was coated with 6% solution of polyurethane (polycarbonate base polyurethane having number-average molecular weight of 3000) in lacquer thinner having a chemical composition by volume consisting of toluene:methyl ethyl ketone:ethyl acetate=50:20:30, by the use of an air spray gun, and then was dried to prepare a protective layer (E) with a coating amount of 15 g/m$^2$ on dry basis of polyurethane. As a result, an image-depicted leather-like sheet with grain was obtained.

(ii) In the image-depicted leather-like sheet obtained in the preceding item (i), precise and fine geometric images were formed strictly in accordance with the original design, and the images were almost free from ink bleeding, disorder or irregularrity. Further, the images were excellent in abrasion resistance to a great extent in that no damage thereto was caused at all even after being subjected to the test of 200 times of repeated friction by using a friction testing machine for dyeing fastness-type II.

EXAMPLE 2

(1) There was used, as the fibrous base material (A), knitting texture having a Metsuke of 400 g/m² prepared by using polyester fiber. The surface of the texture was coated with a solution of polyurethane for use in the concealing layer (B) at a coating amount of 400 g/m², which polyurethane had chemical composition as shown in Table 2. Then the coated texture was placed in 10% aqueous solution of dimethylsulfoxide to solidify and make the polyurethane porous. Thus white porous concealing layer (B) was formed on the fibrous base material (A), and thereafter was dried at 120° C. The resultant concealing layer (B) had a thickness of 200 μm in and a void of 70%.

TABLE 2

Chemical Composition of Polyurethane Solution for Concealing layer (B)

| | parts |
|---|---|
| Polyurethane (polyether-ester-based polyurethane produced by DC&CMCo.* under the trade name "Rezamine CU 7459 A having solid concentration of 25% by weight | 100 |
| Polyurethane (polyether-based polyurethane, produced by DC&CMCo.* under the trade name "Rezamine BS 09-961 having solid concentration of 55% by weight | 20 |
| Polyurethane (polycarbonate-based polyurethane, produced by DC&CMCo.* under the trade name "Rezamine 180 | 20 |
| Dimethylformamide | 40 |

*DC&CMCo.: Dainichiseika Colour & Chemicals Mfg., Co., Ltd.

(2) In the same manner as in Example 1 (3), an easily dyeable layer (C) was formed on the concealing layer (B) which had been formed in the preceding item (1). Subsequently in the same manner as in Example 1 (4), a pattern was printed thereon with an ink-jet printer, and then in the same manner as in Example 1 (5), a protective layer was formed thereon to prepare an image-depicted leather-like sheet. In the image-depicted leather-like sheet thus obtained, precise and fine geometric images were formed strictly in accordance with the original design, and the images were almost free from ink bleeding, disorder or irregularity. Further, the images were excellent in abrasion resistance to a great extent in that no damage thereto was caused at all even after being subjected to the test of 200 times of repeated friction by using a friction testing machine for dyeing fastness-type II.

EXAMPLE 3

(1) A sheet of releasing paper was coated with the solution of the polyurethane same as that used in Example 1 (3) and then dried to form an easily dyeable layer (C) having a thickness of 20 μm.

(2) Subsequently, the easily dyeable layer (C) which had been formed in the preceding item (1) was coated with a solution of polyurethane for use in the concealing layer (B), which polyurethane had chemical composition as shown in Table 3. Then the coating was dried to form the concealing layer (B) having a thickness of 40 μm. Thus the laminate was produced in which the easily dyeable layer (C) and the concealing layer (B) were laminated in turn.

TABLE 3

Chemical Composition of Polyurethane Solution for Concealing layer (B)

| | parts |
|---|---|
| Polyurethane (Polyether-based polyurethane, produced by DC&CMCo.* under the trade name "Rezamine ME 8105" having solid concentration of 30% by weight | 100 |
| Titanium oxide (produced by DC&CMCo.* under the trade name "Seika Seven DUT-09-850") | 30 |
| Dimethylformamide | 40 |
| Methyl ethyl ketone | 40 |

*DC&CMCo.: Dainichiseika Colour & Chemicals Mfg. Co., Ltd.

(3) One surface of the fibrous base material (A) which had been prepared in the same manner as in Example 1 (1) was coated with an adhesive having the chemical composition as shown in Table 4, then the laminate which had been formed on the releasing paper in the preceding item (2) was laminated by bringing the open side of the concealing layer (B) into close contact with the surface of the fibrous base material (A) which surface had been coated with said adhesive, and the resultant laminate was allowed to stand at 70° C. for one minute to cure the adhesive.

TABLE 4

Chemical Composition of Adhesive

| | parts |
|---|---|
| Polyurethane (produced by DC&CMCo.* under the trade name "Rezamine DU 8310" having solid concentration of 60% by weight | 100 |
| Titanium oxide (produced by DC&CMCo.* under the trade name "Seika Seven DUT-09-850") | 30 |
| Crosslinking agent (produced by DC&CMCo.* under the trade name "Rezamine NE") | 8 |
| Crosslinkage accelerator (produced by DC&CMCo.* under the trade name "Rezamine UD 103") | 5 |
| Dimethylformamide | 40 |
| Methyl ethyl ketone | 15 |

*DC&CMCo.: Dainichiseika Colour & Chemicals Mfg. Co., Ltd.

(4) By peeling off the releasing paper, there was obtained on one side of the fibrous base material (A), a light-pink laminate wherein the concealing layer (B) and the easily dyeable layer (C) were laminated and transferred in turn on the fibrous base material (A).

(5) Patterns were printed on the open surface of the easily dyeable layer (C) of the laminate obtained in the preceding item (4), at 360 dots/inch by using four kinds of inks comprising acidic dyes including red, blue, green and black with an ink-jet printer, and were heat-treated in a dryer at 80° C. for 5 minutes to fix the inks.

(6) in the same manner as in Example 1 (5), a protective layer (E) was formed on the surface of the laminate on which the patterns were printed in the preceding item (5) to prepare a leather-like sheet with grains wherein fine and vivid patterns were depicted on a light-pink base having skin-pore grains on the surface. In the leather-like sheet thus obtained, precise and fine geometric images were formed strictly in accordance with the original design, and the images were almost free from ink bleeding, disorder or irregularity. Further, the images were excellent in abrasion resistance to a great extent in that no damage thereto was caused at all even after being subjected to the test of 200 times of repeated friction by using a friction testing machine for dyeing fastness-type II.

EXAMPLE 4

(1) A fibrous base material (A) was prepared in the same manner as in Example 1 (1). The resultant material was divided into two thinner sheets at the middle of thickness line, and the divided surfaces were buffed with sand paper to produce two sheets each having a thickness of 0.5 mm.

(2) The surfaces opposite to the divided surfaces of the two sheets obtained in the preceding item (1) were subjected to buffing with a buffing machine having sand paper of #400 (grain size), then to a relaxation treatment with a circular dyeing machine, and were dried with a tumbler dryer to produce two sheets of suede-like artificial Leather having soft touch {hereinafter referred to as "artificial leather (A)}.

(3) By using one sheet of the artificial leather (A), a concealing layer (B) composed of white polyurethane having a thickness of 45 μm was formed on the suede-like surface thereof (the surface buffed with the buffing machine) in the same manner as in Example 1 (2) (ii)

(4) On the concealing layer (B) formed in the preceding item (3), an easily dyeable layer (C) was formed which had an equilibrium absorption amount of dye of 97.5 mg/g and was composed of polyurethane having a thickness of 15 μm in the same manner as in Example 1(3).

(5) Images were partially printed on the open surface of the easily dyeable layer (C) obtained in the preceding item (4), at 360 dots/inch by using four kinds of inks comprising acidic dyes including red, blue, yellow and black with an ink-jet printer (produced by Canon Inc. under the trade name "Bubble Jet Printer BJC445J"), and were heat-treated in a dryer at 120° C. for 5 minutes to fix the inks.

(6) In the same manner as in Example 1 (5), a protective layer (E) was formed on the surface of the sheet on which the images were depicted in the preceding item (5) to produce a soft leather-like sheet with grains having precise, fine and vivid images (D) {hereinafter referred to as "artificial leather (B)}.

(7) The above-mentioned two kinds of artificial leather were sewn together into sporting gloves (golf gloves) by the use of the artificial leather (A) obtained in the preceding item (2) on the palm side, and the artificial leather (B) obtained in the preceding item (6) on the side of back of hand. In the golf gloves thus obtained, the side of back of hand having fine and vivid patterns was excellent in design properties while the palm side was excellent in mechanical properties, strong, durable and minimized in stuffiness or mustiness. Consequently, ultrahigh quality gloves were obtained. In addition, the patterns on the side of back of hand were excellent in abrasion resistance in that the patterns were never impaired even by a long-term practical use.

Comparative Example 1

(1) A laminate was prepared wherein a fibrous base material (A) was overlaid with a concealing layer (B) in the same manner as in Examples 1 (1) & (2).

(2) The open surface of the concealing layer (B) was coated with 10% solution of polyurethane in dimethylformamide, which polyurethane had been produced by the reaction among a polymer diol with a number-average molecular weight of 2000 composed of polymethylpentaneadipatediol and polyethylene glycol in a ratio by weight of 85:15; 4,4'-diphenylmethane diisocyanate and butanediol and had a nitrogen content of 5%, by the use of a knife coater and was dried at 100° C. to prepare an easily dyeable layer (C) having a thickness of 15 μm. Then, a measurement was made of the equilibrium absorption amount of dye of the easily dyeable layer (C) by the above-described method. The result was 45 mg/g.

(3) Geometric patterns were printed on the open surface of the easily dyeable layer (C) obtained in the preceding item (2), at 80 dots/inch by using tour kinds of inks comprising acidic dyes including red, blue, yellow and black with an ink-jet printer (produced by Canon Inc. under the trade name "Bubble Jet Printer BJC445J"). However, the ink-jet liquid was repelled, thereby failing to form vivid patterns having distinct contour. Even after the patterns were heat-treated for ink fixation, the patterns was never made to deep color-tone.

Comparative Example 2

(1) A fibrous base material (A) was prepared in the same manner as in Example 1 (1). Without installing a concealing layer (B), an easily dyeable layer (C) was formed directly onto one side of the fibrous base material (A) in the same manner as in Example 1 (3).

(2) Geometric patterns were printed on the open surface of the easily dyeable layer (C) obtained in the preceding item (1), at 360 dots/inch by using four kinds of inks comprising acidic dyes including red, blue, yellow and black with an ink-jet printer (produced by Canon Inc. under the trade name "Bubble Jet Printer BJC445J"), and were heat-treated. Thereafter, a protective layer (E) was formed thereon in the same manner as in Example 1 (5) to prepare a leather-like sheet with grains. With regard to the leather-like sheet thus obtained, contamination and fouling in the fibrous base material (A) which were caused during the preparation procedure were developed on the surface thereof, thus failing to clearly finish the images. In addition, the entire sheet had an unfavorable color tone tinged with yellow and further, revealed interior workmanship devoid of vividness, precision and fineness in the images.

EXAMPLE 5

By the procedure same as in Example 1, there were formed a fibrous base material (A), a concealing layer (B) and an easily dyeable layer (C), and also an image (D) with an ink-jet printer. Moreover, a protective layer (E) was formed thereon in the following manner to prepare a leather-like sheet.

[formation of protective layer (E)]

A sheet of release paper was coated with the mixed solution of polyurethane in the form of two-component type as listed hereunder at a coating amount of 80 g/m$^2$, was dried at 60° C. for one minite in a dryer to evaporate away almost all of the solvent in the mixed solution of polyurethane, was laminated onto said image (D)—depicted easily dyeable layer (C) at the time of non-crosslinking condition still maintaining adhesiveness, the resultant laminate was heated at 60° C. for 48 hours, and the sheet of release paper was peeled off from the laminate. Thus a leather-like sheet was obtained in which the concealing layer (B), the easily dyeable layer (C), the image (D) and the protective layer (E) having a thickness of about 35 μm were laminated in turn on the fibrous base material (A). As compared with the leather like sheets obtained in the foregoing Examples 1 to 4, the leather-like sheet obtained in this example was much superior thereto in that the ink bleeding was further lessened, geometric precise and fine patterns were sharply and vividly depicted, strictly in accordance with the original design, and further the images were superior in resistances against abrasion and damage.

TABLE 5

| Chemical Composition of Two-component type Polyurethane Solution | |
| --- | --- |
| | parts |
| Polycarbonate-based polyurethane (produced by Dainippon Ink and Chemicals, Inc. under the trade name "Crisbon TA-205" having solid concentration of 70% by weight) | 100 |
| Crosslinking agent (produced by Dainippon Ink and Chemicals, Inc. under the trade name "Crisbon DN-950" having solid concentration of 70% by weight) | 8 |
| Crosslinkage accelerator (Accel T) | 3 |
| Solvent (dimethylformamide:methyl ethyl ketone = 7:5) | 60 |

What is claimed is:

1. A sheet which comprises a fibrous base material (A), a concealing layer (B), an easily dyeable layer (C) each on said fibrous base material (A) in this order, an image (D) formed on said easily dyeable layer (C) which image has resolution of at least 4 dots/mm and is depicted by an ink-jet system, and a transparent or translucent protective layer (E) on said image, said easily dyeable layer (C) being composed of a polyurethane having a nitrogen content of 3 to 7% by weight and at least 30% by weight of a soft segment of said polyurethane being polyethylene glycol.

2. The sheet according to claim 1, wherein the easily dyeable layer (C) has an equilibrium absorption amount of dye, contained in the ink, of at least 60 mg/g.

3. The sheet according to claim 1, wherein the fibrous base material (A) comprises a fabric which is impregnated or non-impregnated with an elastic polymer.

4. The sheet according to claim 1, wherein the fibrous base material (A) comprises an entangled nonwoven fabric which is impregnated or non-impregnated with an elastic polymer, and which is composed of ultrafine fiber having a single fiber fineness of at most 0.4 denier.

5. The sheet according to claim 1, wherein the protective layer (E) is composed of crosslinking polyurethane obtained from two-component type polyurethane.

6. Golf gloves which are produced by using the sheet as set forth in claim 1 as a material for the side of back of hand, and by using a suede-like artificial leather as material for palm side.

7. A process for producing a sheet, which comprises the steps of:

forming a concealing layer (B) on a fibrous base material (A);

forming an easily dyeable layer (C) on said concealing layer (B), said easily dyeable layer (C) being composed of polyurethane having a nitrogen content of 3 to 7% by weight and at least 30% by weight of a soft segment of said polyurethane being polyethylene glycol;

forming an image (D) on said easily dyeable layer (C) which image has resolution of at least 4 dots/mm and is depicted by an ink-jet system; and forming a transparent or translucent protective layer (E) on said image (D).

8. The process for producing a sheet according to claim 7, wherein the easily dyeable layer (C) is composed of a polymer or a polymer composition each having an equilibrium absorption amount of dye, contained in the ink used for an ink-jet system, of at least 60 mg/g.

9. The process for producing a sheet according to claim 7, wherein the image (D) is depicted by an ink-jet system with an ink containing an acid dye.

10. The process for producing a sheet according to claim 7, wherein the protective layer (E) is composed of polyurethane obtained from two-component type polyurethane.

11. The process for producing a sheet according to claim 10, wherein releasing paper is coated with the solution of two-component type of polyurethane;

the coated releasing paper is heated to evaporate away part of the solvent in the solution;

then the coated releasing paper is laminated on a surface on which an image (D) is formed; and thereafter the releasing paper is peeled off.

* * * * *